(12) United States Patent
Crawford et al.

(10) Patent No.: US 8,646,849 B2
(45) Date of Patent: Feb. 11, 2014

(54) SUPPORT ASSEMBLY

(75) Inventors: Tom Vallance Hamilton Crawford, Malmesbury (GB); Michael Anthony Saunders, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 1177 days.

(21) Appl. No.: 12/276,079

(22) Filed: Nov. 21, 2008

(65) Prior Publication Data

US 2009/0133210 A1    May 28, 2009

(30) Foreign Application Priority Data

Nov. 23, 2007 (GB) .................................. 0723027.9

(51) Int. Cl.
*A63C 17/22* (2006.01)
*B60B 9/12* (2006.01)

(52) U.S. Cl.
USPC .................. 301/5.304; 301/5.307; 152/49

(58) Field of Classification Search
USPC .......... 301/5.301–5.304, 5.307–5.308; 152/5, 152/7, 17, 40, 42, 47, 49
See application file for complete search history.

(56) References Cited

U.S. PATENT DOCUMENTS

| 285,836 | A | * | 10/1883 | Otis | 301/5.304 |
|---|---|---|---|---|---|
| 5,725,284 | A | * | 3/1998 | Boyer | 301/5.302 |
| 5,924,705 | A | * | 7/1999 | Kubelka | 280/11.231 |
| 6,019,378 | A | * | 2/2000 | Cushing | 280/11.209 |
| 6,036,278 | A | * | 3/2000 | Boyer | 301/5.309 |
| 6,935,225 | B2 | * | 8/2005 | Park et al. | 99/348 |
| 7,090,306 | B1 | * | 8/2006 | Piper | 301/5.307 |
| 7,258,639 | B2 | | 8/2007 | Tachibana et al. | |
| 7,694,705 | B2 | * | 4/2010 | Yokobori | 152/176 |
| 2004/0124692 | A1 | * | 7/2004 | Oh | 301/5.1 |

FOREIGN PATENT DOCUMENTS

| CN | 1540183 | 10/2004 |
|---|---|---|
| CN | 101058225 | 10/2007 |
| EP | 0 716 938 | 6/1996 |
| GB | 1510011 | 5/1978 |
| GB | 2 391 459 | 2/2004 |
| JP | 46-18161 | 5/1971 |
| JP | 59-132874 | 9/1984 |
| JP | 62-197461 | 12/1987 |

OTHER PUBLICATIONS

GB Search Report dated Mar. 12, 2008, directed to GB Patent Application No. 0723027.9; 1 page.
International Search Report and Written Opinion mailed on Feb. 17, 2009 directed to counterpart application No. PCT/GB2008/003732; 16 pages.

* cited by examiner

*Primary Examiner* — Jason Bellinger
(74) *Attorney, Agent, or Firm* — Morrison & Foerster LLP

(57) ABSTRACT

A support assembly for a surface treating appliance includes a roller having one or more tires, wherein the one or more tires are fused to the roller. The roller can include a polymer such as polypropylene and may also include a glass filled impact modified copolymer such as a 20% glass filed impact modified copolymer. The tires can include a thermoplastic elastomer such as a modified polymer including a mixture of polypropylene and an ethylene propylene diene monomer. The thermoplastic elastomer may have a hardness of from 55 to 95 Duro measured on the A scale, more specifically from 70 to 79 Duro on the A scale or from 80 to 95 Duro on the A scale.

17 Claims, 6 Drawing Sheets

SUPPORT ASSEMBLY

REFERENCE TO RELATED APPLICATION

This application claims the priority of United Kingdom Application No. 0723027.9, filed Nov. 23, 2007, the contents of which are incorporated herein by reference.

FIELD OF THE INVENTION

This invention relates to a support assembly for a surface treating head or a surface treating appliance, such as a vacuum cleaner, a surface treating appliance including a support assembly and a method for manufacturing a support assembly, or a portion of a support assembly, for a surface treating appliance

BACKGROUND OF THE INVENTION

Surface treating appliances such as vacuum cleaners and floor polishers are well known. The majority of vacuum cleaners are either of the 'upright' type or of the 'cylinder' type, called canister or barrel cleaners in some countries. An example of an upright vacuum cleaner manufactured by Dyson Limited is that sold under the name DC15 ("DC15" is a trade mark of Dyson Limited). DC15 comprises a main body, which houses the main components of the vacuum cleaner, including separating apparatus for separating dirt, dust and other debris from a dirty airflow drawn in by a motor-driven fan. A cleaner head is mounted to the lower end of the main body.

Also at the lower end of the main body is a support assembly in the form of a barrel-shaped roller. The roller permits the cleaner to be easily manoeuvred. In use, a user reclines the main body of the vacuum cleaner and then pushes and pulls a handle which is fixed to the main body of the cleaner. The vacuum cleaner rolls along the floor surface on the roller, and may be steered by the user twisting the handle about its longitudinal axis. This cleaner is much more manoeuvrable than previous cleaners employing wheels. Various components of the cleaner are mounted within the roller as a space-saving measure. The roller has a plurality of tires which are mechanically fixed to it and help to make the roller more hard wearing and easier to steer.

A problem which may be encountered with this support assembly is that the tire(s) may become disconnected from the roller.

SUMMARY OF THE INVENTION

A first aspect of the present invention provides a support assembly for a surface treating appliance comprising a roller having one or more tires, wherein the one or more tires are fused to the roller.

As used herein the term "fused" shall be taken to mean that the roller and the one or more tires are bonded together rather than mechanically connected to each other. This advantageously helps to prevent the one or more tires separating from the roller over time. It also may advantageously reduce the amount of material necessary to make the tires and therefore it may also advantageously reduce the costs involved in making the support assembly.

In a preferred embodiment the roller and the one or more tires are fused together by at least partially melting and solidifying them together.

The roller may comprise a polymer, for example polypropylene. In a particular embodiment the polypropylene may comprise a glass filled impact modified copolymer, for example a 20% glass filed impact modified copolymer.

The one or more tires may comprise a thermoplastic elastomer, for example a modified polymer. In a particular example the modified polymer may comprise a mixture of polypropylene and an ethylene propylene diene monomer, for example the modified polymer sold under the trade name Santoprene®.

The thermoplastic elastomer may be from 55 to 95 Duro measured on the A scale. More preferably the thermoplastic elastomer may be from 70 to 79 Duro on the A scale, for example 75 Duro A. Alternatively the thermoplastic elastomer may be from 80 to 95 Duro on the A scale, for example 90 Duro A.

The roller preferably defines a substantially continuous rolling support surface. In a particular embodiment the one or more tires are rectangular or substantially rectangular in cross section. Alternatively they may be square or substantially square in cross section. In a particular embodiment, the surface of the one or more tires which faces outwardly may be curved. The roller preferably comprises a plurality of tires. The tires may run parallel or substantially parallel to each other. In a preferred embodiment the tires may be equally spaced. The one or more tires may be from 3, or 5, or 7, or 10, or 12 to 14 or 16, or 18 or 20 mm in diameter.

In an embodiment the support assembly may be a single unit. In an alternative embodiment the support assembly may be formed from a number of parts which are fixed together in any suitable manner.

A second aspect of the present invention provides a surface treating appliance including a support assembly as described above. In a preferred embodiment the roller delimits a region housing a component of the appliance. In a particularly preferred embodiment the surface treating appliance may be a vacuum cleaner.

A third aspect of the present invention provides a method for manufacturing a support assembly or a portion of a support assembly, for a surface treating appliance comprising the steps of a) placing a roller or a portion of a roller, made of a first material which has a first melting temperature, into an over mould b) overmolding one or more tires onto the roller or portion of the roller by introducing a second material in a molten state into the over mould c) allowing the second material to solidify d) separating the support assembly or portion of the support assembly from the overmold, wherein the second material is introduced into the overmold at a temperature which is higher than the first melting temperature.

The method may also comprise a further step x) before step a) of forming a roller or portion of a roller. The roller or portion of the roller may be formed by injection moulding the first material into the shape of a roller or portion of a roller.

In a particular embodiment, in step b) the one or more tires may be overmolded onto the roller or portion of the roller by introducing the second material in a molten state into a channel or a plurality of channels formed between the roller or portion of the roller, and the over mould.

In a preferred embodiment in step x) the roller or portion of the roller may be formed with one or more channels on its outer surface. Additionally or alternatively the overmold may comprise one or more channels.

The first material preferably comprises a polymer for example polypropylene. The polypropylene may comprise a glass filled impact modified copolymer, for example a 20% glass filed impact modified copolymer, for example a 20% glass filed impact modified copolymer with a melting temperature of around 167° C. or 167° C. Preferably in step x) the first material is injection moulded at from 220, or 225, or 230, or 235, or 240 to 245, or 250, or, 255, or 260, or 265, or 270° C. In a preferred embodiment in step x) the first material is injection moulded at from 230 to 270° C.

The second material may comprise a thermoplastic elastomer, for example a modified polymer. In a preferred embodiment the modified polymer may comprise a mixture of polypropylene and an ethylene propylene diene monomer, for example the commercially available thermoplastic elastomer Santoprene® which has a melting temperature of around 150° C. or 150° C.

Preferably a thermoplastic elastomer having a Duro measurement on the A scale of from 55 to 95, more preferably from 70 to 79 Duro A or from 80 to 95 Duro A is used in step b) to form the one or more tires. In a particularly preferred embodiment the thermoplastic elastomer may be 75 or 90 Duro A.

In a preferred embodiment in step b) the second material is introduced into the overmold at from 170, or 175, or 180, or 185, or 190, or 195, or 200 to 205, or 210, 215, or 220, or 225, or 230° C., preferably at between 210 and 215° C. Because the second material is introduced into the overmold at a temperature which is higher than the first melting temperature the first material will melt on contact with the second material causing the first and second materials at the points of contact to mix at least slightly.

The term "surface treating appliance" is intended to have a broad meaning, and includes a wide range of machines having a head for travelling over a surface to clean or treat the surface in some manner. It includes, inter alia, machines which apply suction to the surface so as to draw material from it, such as vacuum cleaners (dry, wet and wet/dry), as well as machines which apply material to the surface, such as polishing/waxing machines, pressure washing machines, ground marking machines and shampooing machines. It also includes lawn mowers and other cutting machines.

Use of the term "roller" is intended to encompass wheels and rolling surfaces in general.

BRIEF DESCRIPTION OF THE DRAWINGS

The invention will now be described, by way of example, with reference to the accompanying drawings, in which.

All figures are schematic. Like reference numerals refer to like parts throughout the specification.

DETAILED DESCRIPTION OF THE INVENTION

Figure 1:
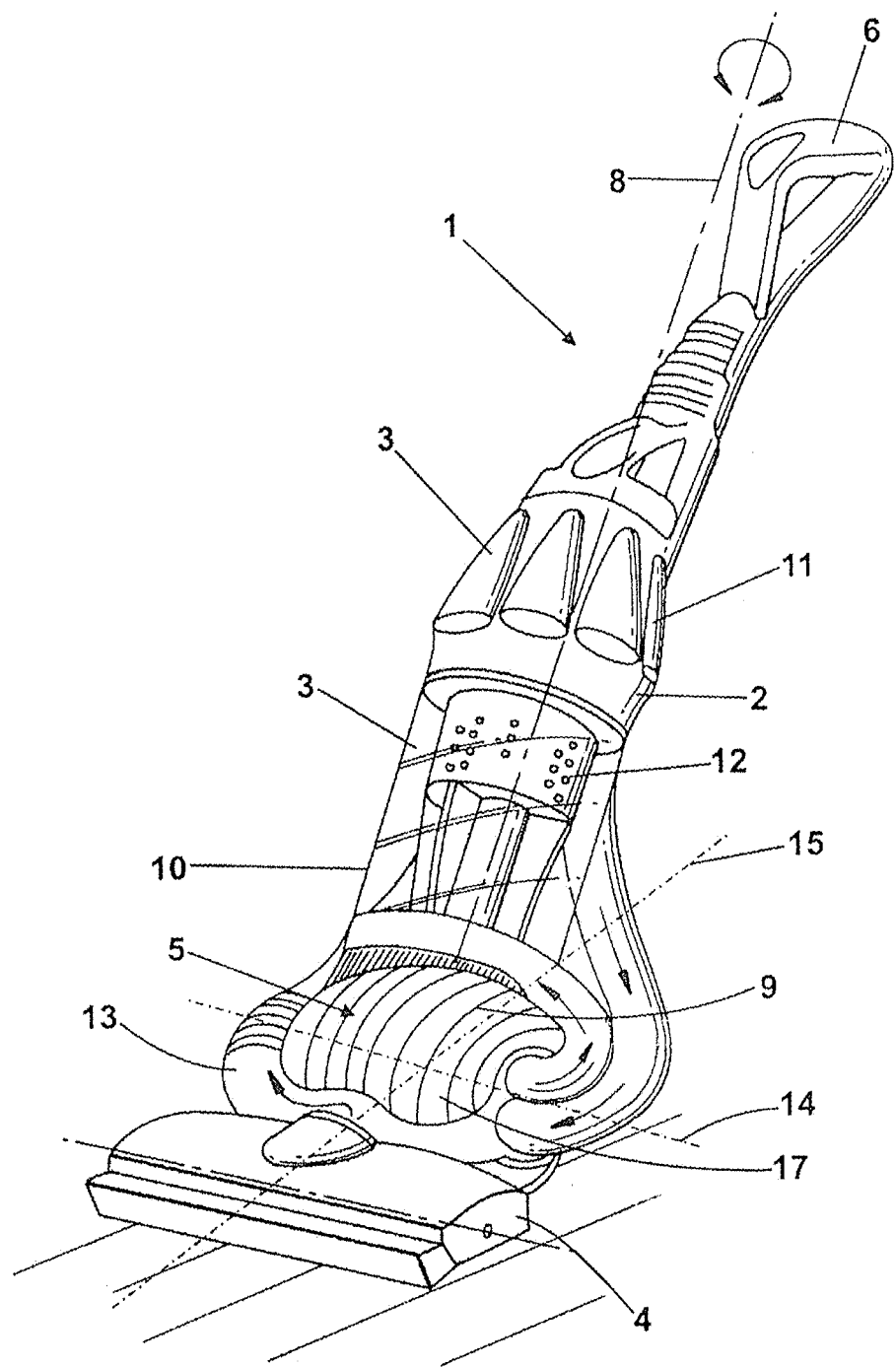
FIG. 1 is a perspective view of a vacuum cleaner incorporating the support assembly of the present invention.

With reference to FIG. 1, a surface treating appliance is shown in the form of a vacuum cleaner and is indicated generally by the reference numeral 1. The vacuum cleaner 1 comprises a main body 2, a cleaner head 4 and a rolling support assembly indicated generally at 5 for rolling the cleaner 1 along a floor surface. The rolling support assembly 5 houses a motor and fan for generating a suction airflow (not visible in this drawing). The main body 2 houses a separating apparatus 3 for separating dirt, dust and other debris from a dirty airflow drawn into the cleaner 1 by the fan and motor.

In this embodiment, the separating apparatus 3 is cyclonic, in which the dirt and dust is spun from the airflow. The cyclonic separating apparatus 3 comprises two stages of cyclonic separation arranged in series with one another. The first stage is a cylindrically-walled chamber 10 and the second stage comprises a set of tapering, substantially frusto-conically shaped chambers 11 arranged in parallel with one another. Airflow is directed tangentially into the upper part of the chamber 10. Larger debris and particles are removed and collected in the lower part of the chamber 10. The airflow then passes through a shroud 12 to the set of smaller frusto-conically shaped cyclonic chambers 11. Finer dust is separated by these chambers 11 and the separated dust is collected in a common collecting region (not visible in this drawing).

The cleaner 1 also houses filters (not visible in this drawing) for trapping fine particles in the cleaned airflow. These filters remove any fine particles of dust which have not already been removed from the airflow by the separating apparatus 3. A first filter, called a pre-motor filter, is provided before the motor and fan. A second filter, called a post-motor filter, is provided after the motor and fan. Where the motor for driving the suction fan has carbon brushes, the post-motor filter also serves to trap any carbon particles emitted by the brushes. Clean air is then expelled to the atmosphere.

The cleaner head 4 is pivotably mounted to the lower end of the main body 2, and serves, in use, to treat the floor surface.

The rolling support assembly 5 permits the cleaner 1 to be manoeuvred along a floor surface. In order to provide extra support for the cleaner 1 when the main body 2 is in the vertical position a stand may be provided (not visible in this drawing).

A user-operable wand handle 6 extends upwardly from the rear part of the main body 2. The wand handle 6 may be released and used as a hose and wand assembly. A changeover valve (not visible in this drawing) on the main body 2 automatically connects the dust separating apparatus 3 to the wand and hose so that cleaner 1 can be used in cylinder mode for above the floor cleaning. Air is drawn into the cleaner 1 through the end of the wand which can be released from the cleaner 1 for appropriate manipulation. The inlet in the cleaner head 4 is automatically shut off.

When the cleaner 1 is to be used in conventional upright mode, the user reclines the main body 2. The changeover valve automatically shuts off the air inlet at the distal end of the wand handle 6 and connects the dust separating apparatus 3 to the inlet in the cleaner head 4.

The cleaner head 4 is connected to the main body 2 of the vacuum cleaner 1 in such a manner that the cleaner head 4 remains in contact with a floor surface as the main body 2 is manoeuvred through a wide range of operating positions, e.g. when moved from side-to-side or when the main body 2 is twisted about its longitudinal axis 8. A linkage in the form of a yoke 13 forms a connection between the main body 2 and the cleaner head 4. The yoke 13 comprises a shell, which is moulded to incorporate two rotational axes 14, 15. The first axis 14, which extends across the sides of the shell, permits the main body 2 to pivot with respect to the yoke 13 when it is reclined for a cleaning operation in the upright mode. The second axis 15, which depends from the front of the shell, permits the head 4 to turn with respect to the yoke 13 when the cleaner is being steered along a floor surface. The two axes 14, 15 are transverse to each other. This arrangement permits the cleaner 1 to be more easily manoeuvred than traditional vacuum cleaners.

Figure 2:
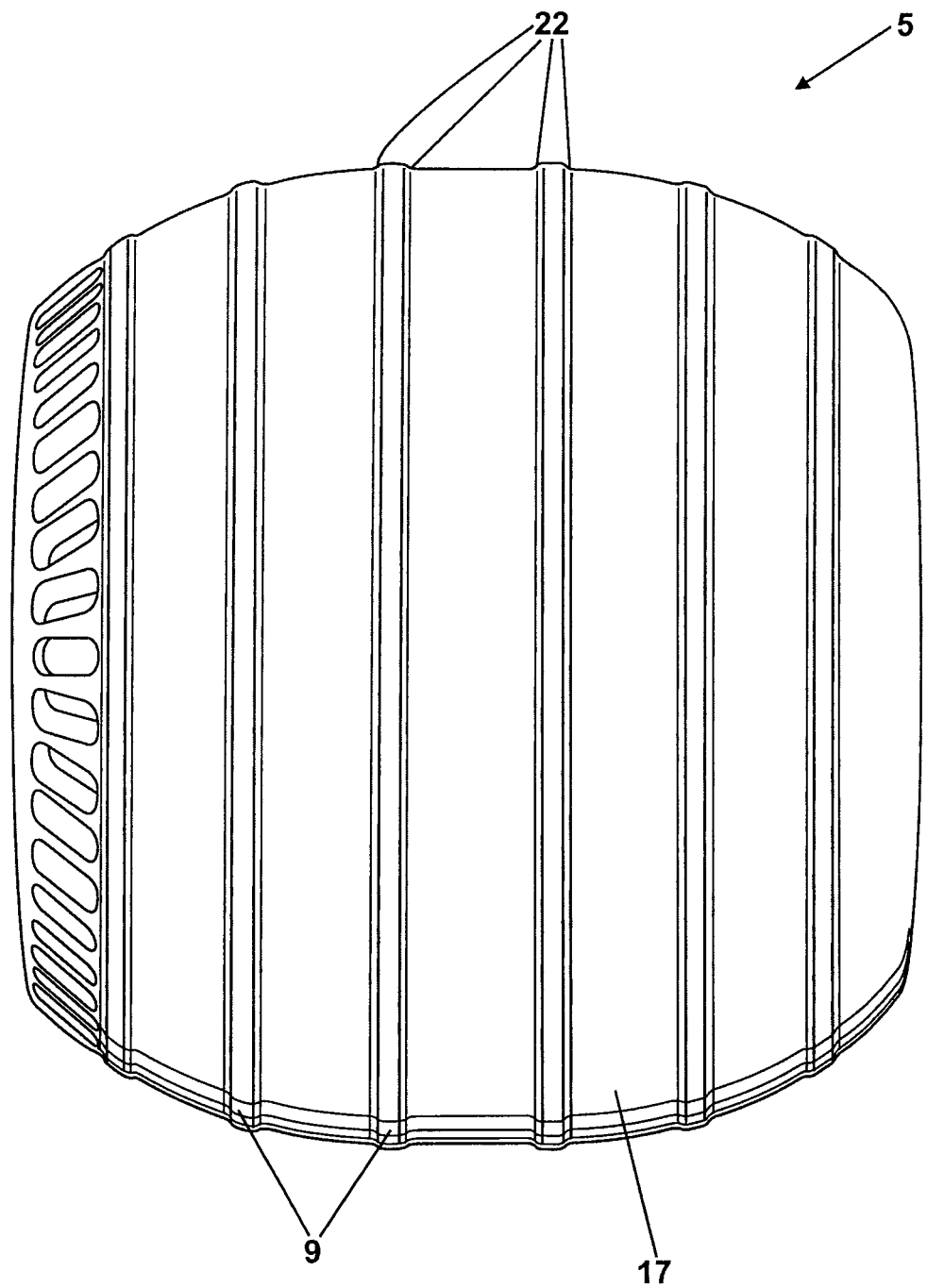
FIG. 2 is a view of the support assembly of the present invention.
Figure 4:
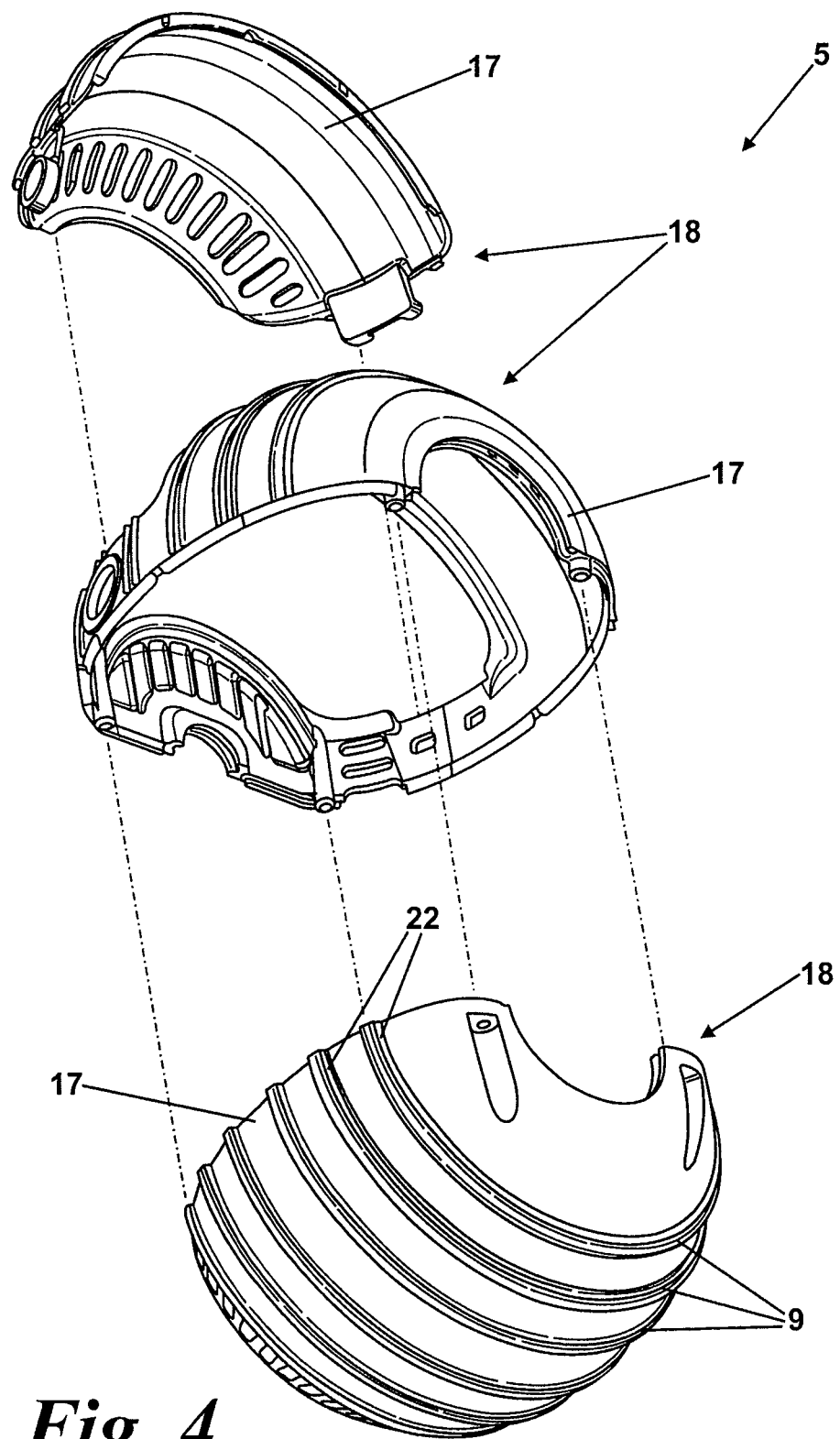
FIG. 4 is an exploded view of the support assembly.

The support assembly as shown in FIGS. 2 and 4 comprises an elongated and barrel-shaped roller 17. This shape helps to provide both stability and manoeuvrability. A plurality of tires 9 are fused around the circumference of the roller 17 to form the support assembly 5. The tires 9 provide extra grip as the support assembly 5 is rolled along a surface to be treated. The roller 17 and the tires 9 are fused by melting and solidifying them together. The support assembly 5 may be a single piece as shown in FIG. 2 or alternatively may comprise a number of portions 18 as shown in FIG. 4.

Figure 5:
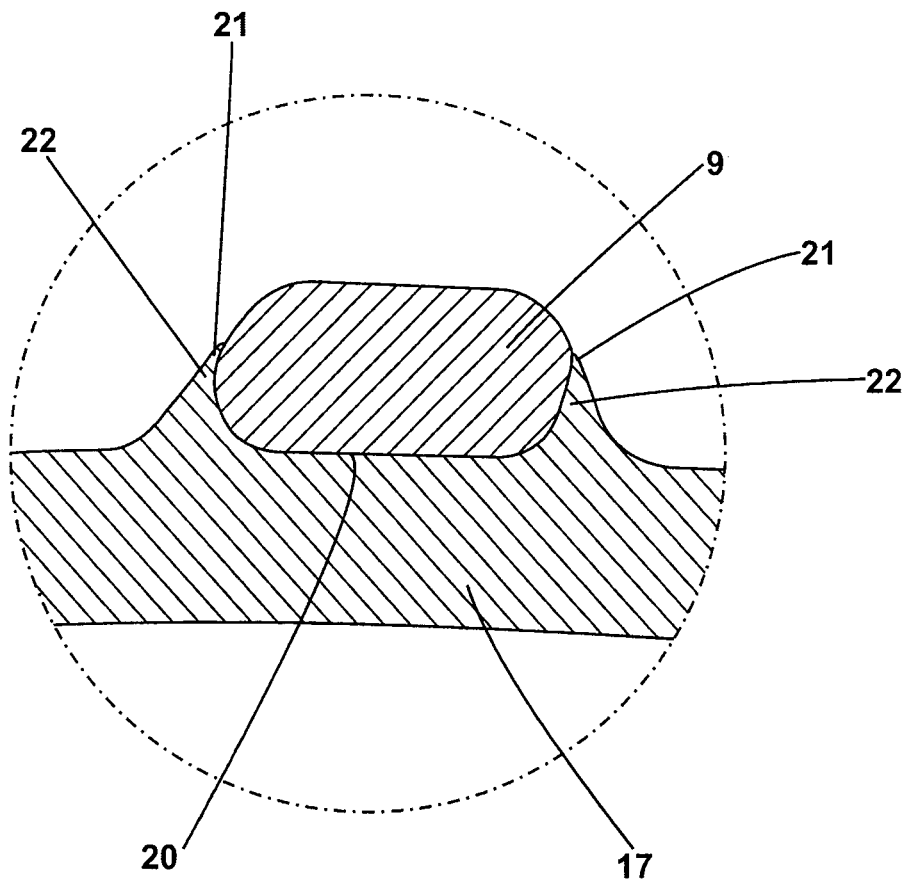
FIG. 5 is a close up view of a tire and roller according to the present invention.

In the embodiments shown in FIGS. 2 and 4 and the close up shown in FIG. 5 it can be seen that the tires 9 are substantially rectangular in cross section, having curved edges. Alternatively they may be square or ovoid. In the embodiment shown in FIGS. 2 and 4 it can be seen that there are 6 tires 9 which run parallel to each other and are equally spaced. The number of tires 9 may vary but preferably there is an even number.

In a particular embodiment the roller 17 is formed from a 20% glass filled polypropylene which has a melting temperature of 167° C. and the tires 9 are formed of Santoprene® which has a melting temperature of 150° C. Two grades of Santoprene® are particularly preferred, 75 Duro A and 90 Duro A.

Figure 3:
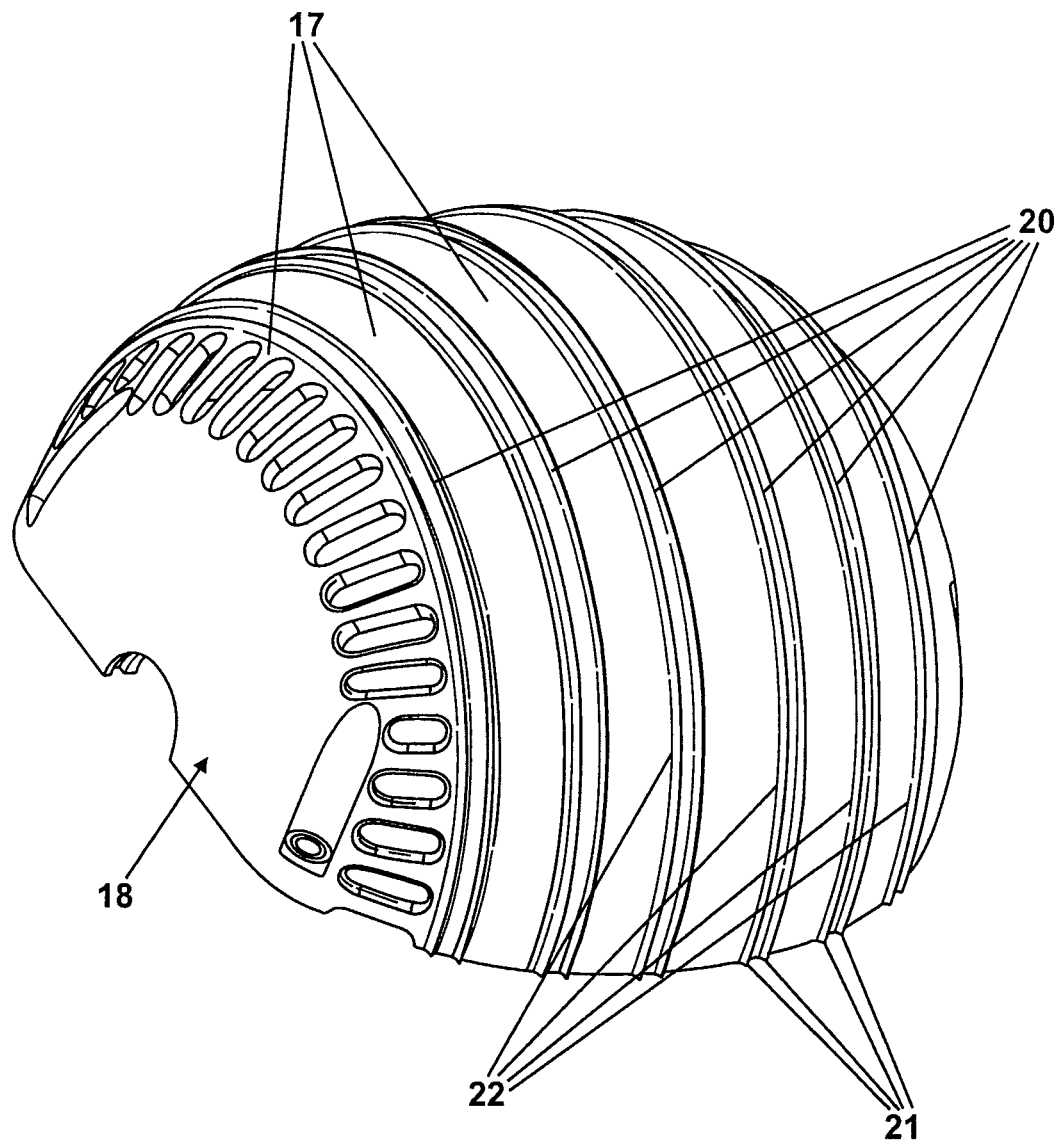
FIG. 3 is a perspective view of a portion of a roller according to the present invention.

The roller 17 shown in FIG. 3 is preferably formed by injection moulding. 20% glass filed polypropylene at between 230° C. and 270° C. is injected into a mould (not shown) for making a roller 17 or portion of the roller 17. The polypropylene is then allowed to solidify and the formed roller 17 or portion of the roller 17 is then separated from the mould.

Figure 6:
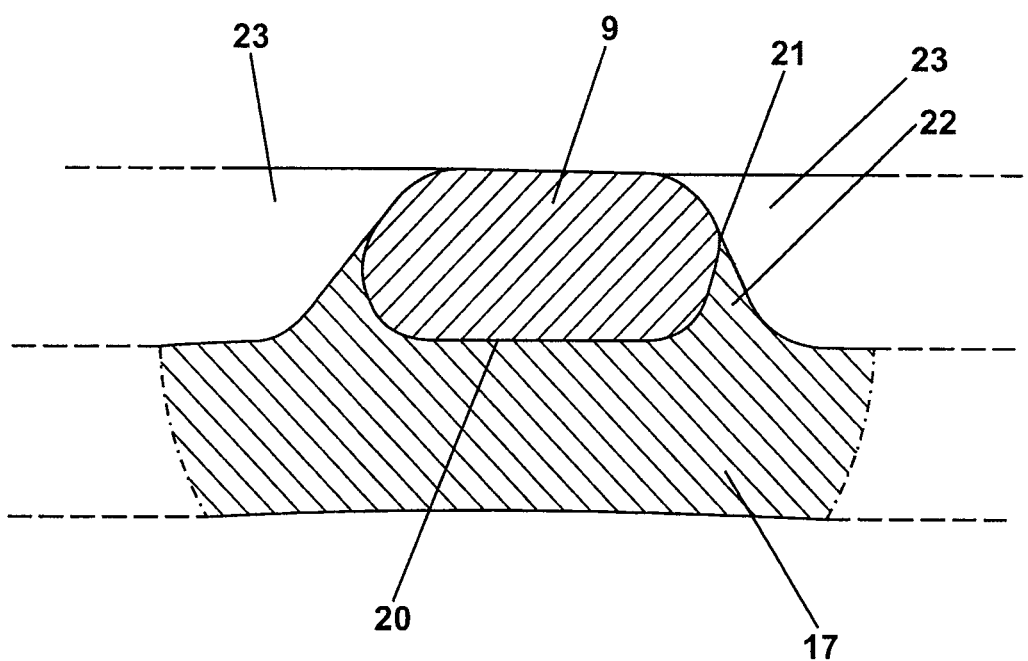
FIG. 6 is a close up view of a section of roller positioned in an overmold according to the present invention.

The roller 17 or portion of the roller 17 is then placed into an overmold 23 (see FIG. 6). One or more tires 9 are then overmolded onto the roller 17 or portion of the roller 17 by introducing molten Santoprene® into a plurality of channels 20 formed between the roller 17 or the portion of the roller 17 and the over mould 23. Santoprene® is preferably introduced into the channels 20 at between 200° C. and 230° C., preferably at between 210° C. and 215° C. At this temperature the polypropylene which it comes into contact with will start to melt.

In a preferred embodiment, as can be seen in FIG. 3 the roller 17 or portion of the roller 17 is formed with integral channels 20. These channels 20 preferably have a flexible tip 21 which bend when the roller 17 or portion of the roller 17 is placed in the overmold 23 and the tips 21 contact the overmold 23. These flexible tips 21 form a seal against the overmold 23 so that when molten Santoprene® is introduced into the channels 20 it does not leak and therefore forms even tires 9 bounded by the channel walls 22.

After the Santoprene® has been added to the overmold 23 it is allowed to cool. Once cooled the formed support assembly 5 or portions 18 of the support assembly 5 can be removed from the overmold 23.

If the support assembly 5 is made in portions 18, the portions 18 can be joined together to make a complete support assembly 5 after overmolding the tires 9.

Alternatively portions of the roller can be joined together to make a complete roller 17 before overmolding the tires 9 onto it to become a support assembly 5.

Furthermore, although the invention has been described with reference to a support assembly 5 for a vacuum cleaner 1, the invention is applicable to a rolling support assembly 5 for a tool for such a cleaner 1.

While the illustrated embodiment shows a vacuum cleaner 1 in which ducts carry airflow, it will be appreciated that the invention can be applied to vacuum cleaners 1 which carry other fluids, such as water and detergents, as well as other surface-treating appliances.

The invention claimed is:

1. A support assembly for a surface treating appliance comprising a roller formed with a plurality of channels on its outer surface, each channel being bounded by channel walls extending outwardly from the outer surface of the roller and each channel wall having a flexible tip, the roller having a plurality of tires, each tire being located in a respective channel wherein the tire is fused to an inner surface of the channel between the flexible tips by overmolding the tire onto the roller.

2. A support assembly according to claim 1, wherein the roller comprises a polymer.

3. The support assembly of claim 2, wherein the polymer comprises polypropylene.

4. The support assembly of claim 3, wherein the polypropylene comprises a glass filled impact modified copolymer.

5. A support assembly according to claim 4, wherein the glass filled impact modified copolymer is a 20% glass filled impact modified copolymer.

6. The support assembly of claim 2 or 3, wherein the one or more tires comprise a thermoplastic elastomer.

7. The support assembly of claim 6, wherein the polymer comprises a mixture of polypropylene and an ethylene propylene diene monomer.

8. The support assembly of claim 6, wherein the thermoplastic elastomer has a hardness of from 55 to 95 Duro measured on the A scale.

9. The support assembly of claim 8, wherein the thermoplastic elastomer has a hardness of from 70 to 79 Duro on the A scale.

10. The support assembly of claim 8, wherein the thermoplastic elastomer has a hardness of from 80 to 95 Duro on the A scale.

11. The support assembly of claim 2 or 3, wherein the roller defines a substantially continuous rolling support surface.

12. The support assembly of claim 2 or 3, wherein the one or more tires are rectangular or substantially rectangular in cross section.

13. The support assembly of claim 1, wherein the tires run parallel or substantially parallel to each other.

14. The support assembly of claim 13, wherein the tires are equally spaced.

15. A surface treating appliance comprising the support assembly of claim 2 or 3.

16. The surface treating appliance of claim 15, wherein the roller delimits a region housing a component of the appliance.

17. A vacuum cleaner comprising the surface treating appliance of claim 16.

* * * * *